United States Patent
Harmon et al.

(10) Patent No.: US 12,459,438 B2
(45) Date of Patent: Nov. 4, 2025

(54) FRONT TRUNK CONFIGURED TO FACILITATE WIRELESS CHARGING

(71) Applicant: Ford Global Technologies, LLC, Dearborn, MI (US)

(72) Inventors: Michael John Harmon, Northville, MI (US); Jesse Rene Diephuis, West Bloomfield, MI (US); Ryan Wayne Warner, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 376 days.

(21) Appl. No.: 17/892,404

(22) Filed: Aug. 22, 2022

(65) Prior Publication Data
US 2023/0391272 A1     Dec. 7, 2023

Related U.S. Application Data

(60) Provisional application No. 63/347,704, filed on Jun. 1, 2022.

(51) Int. Cl.
| | | |
|---|---|---|
| *B60R 5/02* | (2006.01) | |
| *B60J 5/02* | (2006.01) | |
| *B60Q 3/30* | (2017.01) | |
| *B60R 16/033* | (2006.01) | |
| *H02J 50/00* | (2016.01) | |
| *H02J 50/10* | (2016.01) | |

(52) U.S. Cl.
CPC ............ *B60R 5/02* (2013.01); *B60J 5/02* (2013.01); *B60Q 3/30* (2017.02); *B60R 16/033* (2013.01); *H02J 50/005* (2020.01); *H02J 50/10* (2016.02)

(58) Field of Classification Search
CPC . B60R 5/02; B60R 16/033; B60J 5/02; B60Q 3/30; H02J 50/005; H02J 50/10; H02J 7/0044; Y02T 10/70; Y02T 10/7072

USPC ........................................................ 296/37.1
See application file for complete search history.

(56) References Cited

U.S. PATENT DOCUMENTS

| | | | | |
|---|---|---|---|---|
| 2,568,628 A | * | 9/1951 | Herring .................. | B62D 43/10 |
| | | | | 211/144 |
| 6,335,687 B1 | * | 1/2002 | Terashima .............. | E05B 83/26 |
| | | | | 340/425.5 |
| 7,164,255 B2 | * | 1/2007 | Hui .......................... | H02J 50/10 |
| | | | | 320/108 |
| 7,905,532 B2 | * | 3/2011 | Johnson .................. | B62D 33/03 |
| | | | | 296/26.11 |

(Continued)

FOREIGN PATENT DOCUMENTS

JP           6502045 B2 *   4/2019   .........  G06Q 30/0255

OTHER PUBLICATIONS

Halvorson, B. (Nov. 16, 2021). 2022 Ford F-150 Lightning Electric Truck's frunk is more than the space left over. Green Car Reports. Retrieved Aug. 17, 2022, from https://www.greencarreports.com/news/1134181_2022-ford-f-150-lightning-electric-truck-frunk-more-than-the-space-left-over.

(Continued)

*Primary Examiner* — Joseph D. Pape
(74) *Attorney, Agent, or Firm* — Vichit Chea; Carlson, Gaskey & Olds, P.C.

(57) ABSTRACT

This disclosure relates to a front trunk configured to facilitate wireless charging. In some aspects, the techniques described herein relate to a motor vehicle, including: a front trunk including a wireless charger configured to wirelessly charge an electronic device adjacent the front trunk.

20 Claims, 3 Drawing Sheets

(56) References Cited

U.S. PATENT DOCUMENTS

| | | | |
|---|---|---|---|
| 9,487,248 B1* | 11/2016 | Buckhalt | B60J 7/141 |
| 11,142,129 B2 | 10/2021 | Howard, II et al. | |
| 2011/0031771 A1* | 2/2011 | Ding | B60R 5/02 |
| | | | 296/76 |
| 2021/0086840 A1* | 3/2021 | Glickman | B62D 25/24 |
| 2022/0032796 A1 | 2/2022 | Salter et al. | |
| 2022/0289312 A1* | 9/2022 | Aquila | B60N 3/001 |

OTHER PUBLICATIONS

Masker, M. (n.d.). Ford F150 Lightning EV truck's front trunk: What the frunk? DrivingLine. Retrieved Aug. 17, 2022, from https://www.drivingline.com/articles/ford-f150-lightning-ev-truck-what-the-frunk/.

* cited by examiner

FRONT TRUNK CONFIGURED TO FACILITATE WIRELESS CHARGING

RELATED APPLICATION(S)

This application claims the benefit of U.S. Provisional Application No. 63/347,704, filed Jun. 1, 2022, the entirety of which is herein included by reference.

TECHNICAL FIELD

This disclosure relates to a front trunk configured to facilitate wireless charging.

BACKGROUND

Electrified vehicles are being developed to either reduce or completely eliminate the reliance on internal combustion engines. With the onset of electrified vehicles, many existing components in the vehicle engine compartment may become unnecessary. The space made available by the removal of these components makes room for a front trunk, which is a storage compartment located near the front of the vehicle, and which is commonly referred to using the portmanteau "frunk."

SUMMARY

In some aspects, the techniques described herein relate to a motor vehicle, including: a front trunk including a wireless charger configured to wirelessly charge an electronic device adjacent the front trunk.

In some aspects, the techniques described herein relate to a motor vehicle, wherein the front trunk includes a floor, and wherein the floor includes the wireless charger.

In some aspects, the techniques described herein relate to a motor vehicle, further including a plurality of storage compartments arranged within the front trunk and spaced-apart above the floor.

In some aspects, the techniques described herein relate to a motor vehicle, further including a plurality of electrical outlets arranged above the plurality of storage compartments.

In some aspects, the techniques described herein relate to a motor vehicle, further including a light source arranged above the plurality of storage compartments and configured to illuminate an area below the light source.

In some aspects, the techniques described herein relate to a motor vehicle, further including a closure assembly configured to move between closed and open positions to selectively cover and uncover the front trunk, and wherein a surface of the closure assembly includes the wireless charger.

In some aspects, the techniques described herein relate to a motor vehicle, wherein the closure assembly includes a grille panel configured to rotate between a closed position and an open position to selectively cover and uncover the front trunk from a front, and the surface is a surface of the grille panel facing an interior of the front trunk when the grille panel is closed.

In some aspects, the techniques described herein relate to a motor vehicle, wherein the surface is substantially parallel to a ground surface when the grille panel is open.

In some aspects, the techniques described herein relate to a motor vehicle, wherein the front trunk includes a floor, and wherein the floor includes another wireless charger.

In some aspects, the techniques described herein relate to a motor vehicle, further including at least one panel configured to slide laterally relative to the grille panel between an expanded and retracted position when the grille panel is open.

In some aspects, the techniques described herein relate to a motor vehicle, further including a tool mounted to the at least one panel.

In some aspects, the techniques described herein relate to a motor vehicle, wherein the at least one panel is replaceable.

In some aspects, the techniques described herein relate to a motor vehicle, wherein the at least one panel includes a first panel configured to slide laterally relative to the grille panel in a first direction between an expanded and retracted position and further includes a second panel configured to slide laterally relative to the grille panel in a second direction opposite the first direction between an expanded and retracted position.

In some aspects, the techniques described herein relate to a motor vehicle, further including a light source arranged adjacent a top of the front trunk, wherein, when the grille panel is open and the first and second panels are in respective expanded positions, the light source is configured to illuminate the grille panel, the first panel, and the second panel.

In some aspects, the techniques described herein relate to a motor vehicle, wherein the motor vehicle is an electrified vehicle including a battery pack, and wherein the motor vehicle is configured to provide electricity from the battery pack to the wireless charger.

In some aspects, the techniques described herein relate to a method, including: wirelessly charging a portable electronic devices adjacent a front trunk of a motor vehicle.

In some aspects, the techniques described herein relate to a method, further including: rotating a grille panel to an open position in which a top surface of the grille panel is substantially parallel to a ground surface, wherein the top surface includes a wireless charger.

In some aspects, the techniques described herein relate to a method, wherein the front trunk includes a floor, and wherein the floor also includes a wireless charger.

In some aspects, the techniques described herein relate to a method, further including, when the grille panel is open, sliding at least one panel laterally relative to the grille panel between an expanded and retracted position.

In some aspects, the techniques described herein relate to a method, further including, when the grille panel is open and the at least one panel is in an expanded position, illuminating the grille panel and the at least one panel by activating a light source mounted adjacent a top of the front trunk.

DETAILED DESCRIPTION

This disclosure relates to a front trunk configured to facilitate wireless charging, such as wireless charging of portable electronic devices, including tools, computing devices, smartphones, etc. Among other benefits, which will be appreciated from the below description, the disclosed features increase the usability of the front trunk, and, in turn, the vehicle overall.

Figure 1:
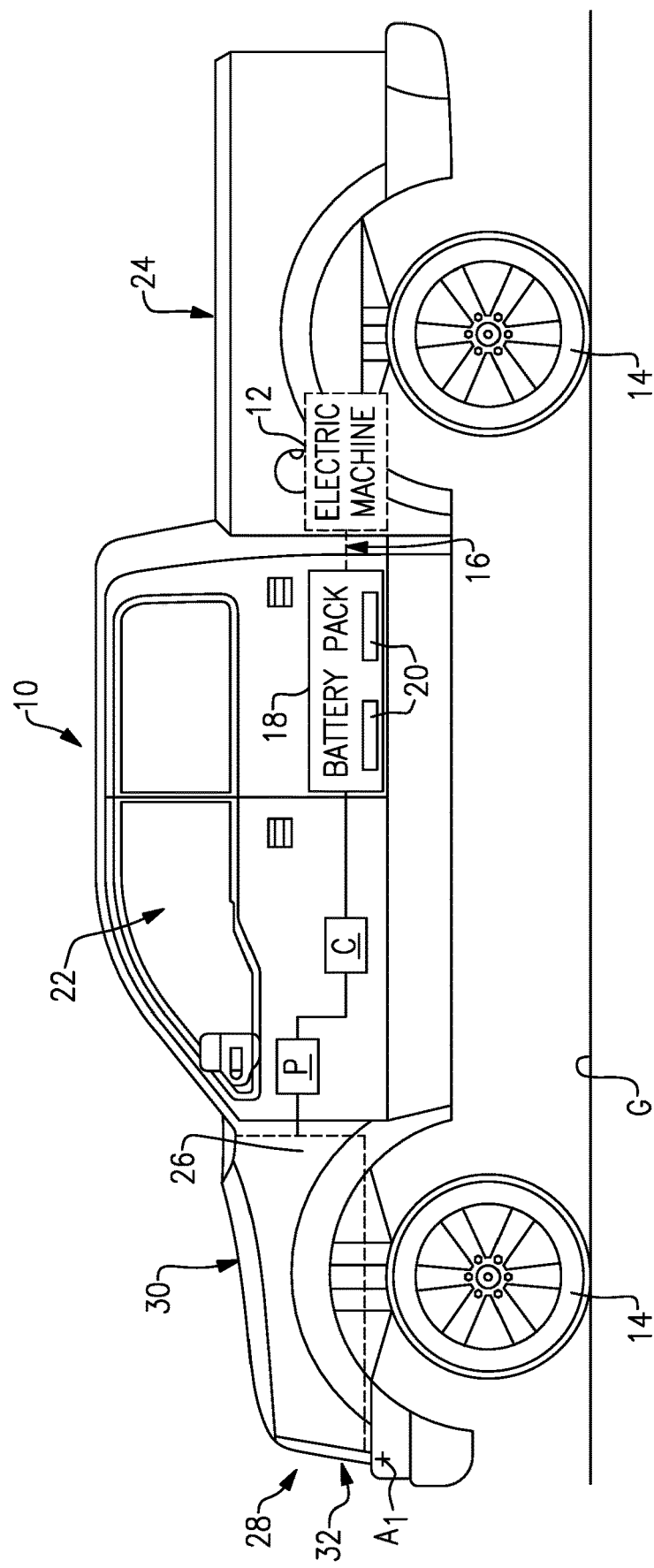
FIG. 1 schematically illustrates an electrified vehicle.

FIG. 1 schematically illustrates a motor vehicle, which here is an electrified vehicle 10 ("vehicle 10"). The vehicle 10 may include any type of electrified powertrain. In an embodiment, the vehicle 10 is a battery electric vehicle (BEV). However, the concepts described herein are not limited to BEVs and could extend to other electrified vehicles, including, but not limited to, plug-in hybrid electric vehicles (PHEVs), fuel cell vehicles, etc. Therefore, although not specifically shown in this embodiment, the vehicle 10 could be equipped with an internal combustion engine that can be employed either alone or in combination with other energy sources to propel the vehicle 10. In particular, certain aspects of this disclosure could apply to vehicles other than electrified vehicles that include front trunks, such as mid-engined or rear-engined vehicles.

In the illustrated embodiment, the vehicle 10 is a full electric vehicle propelled solely through electric power, such as by one or more electric machines 12, without any assistance from an internal combustion engine. The electric machine 12 may operate as an electric motor, an electric generator, or both. The electric machine 12 receives electrical power and provides a rotational output torque to one or more drive wheels 14, such as through a transmission gearbox (not shown).

A voltage bus 16 electrically connects the electric machine 12 to a battery pack 18. The battery pack 18 is an exemplary electrified vehicle battery. The battery pack 18 may be a high voltage traction battery pack that includes one or more battery arrays 20 (i.e., groupings of rechargeable battery cells) capable of outputting electrical power to operate the electric machine 12 and/or other electrical loads of the vehicle 10. Other types of energy storage devices and/or output devices can also be used to electrically power the vehicle 10.

In the illustrated embodiment, the vehicle 10 is a pickup truck. However, the vehicle 10 could also be a car, a van, a sport utility vehicle, or any other type of vehicle.

As shown in FIG. 1, the vehicle 10 includes a passenger cabin 22, a truck bed 24 located to the rear of the passenger cabin 22, and a front trunk 26 located to the front of the passenger cabin 22. The truck bed 24 may establish a first cargo space of the vehicle 10, and the front trunk 26 may establish a second cargo space of the vehicle 10. The front trunk 26 may be referred to using the portmanteau "frunk" or more generally as a front cargo space.

The front trunk 26 may provide an additional cargo space not traditionally available in most conventional internal combustion powered vehicles. This disclosure includes various features that increase the usefulness and usability of the front trunk 26.

The front trunk 26 is selectively covered by a closure assembly 28. In this example, the closure assembly 28 includes grille panel 32 which is moveable relative to a remainder of a body of the vehicle 10, including a hood panel 30, which is fixed in this example. The grille panel 32, in this example, is rotatable about axis $A_1$ adjacent a bottom of the grille panel 32 to move between closed (FIG. 1) and open (FIG. 2) positions to selectively cover and uncover the front trunk 26 from the front. The axis $A_1$ is substantially perpendicular to the centerline of the vehicle 10, in this example. The location of the axis $A_1$ is representative. Other locations for the axis $A_1$ come within the scope of this disclosure.

The grille panel 32 may be sized and shaped to match a grille in an engine-driven model of a vehicle, such as a pickup truck, in order to maintain the same look and allow for essentially the same front end vehicle body structure across a vehicle lineup. While the grille panel 32 may be configured to look the same as engine-driven vehicles, the grille panel 32 exhibits solid surfaces configured to keep water out of the front trunk 26. In this example, the solid surfaces are feasible in the vehicle 10 because no air flow is needed for engine cooling.

Figure 2:
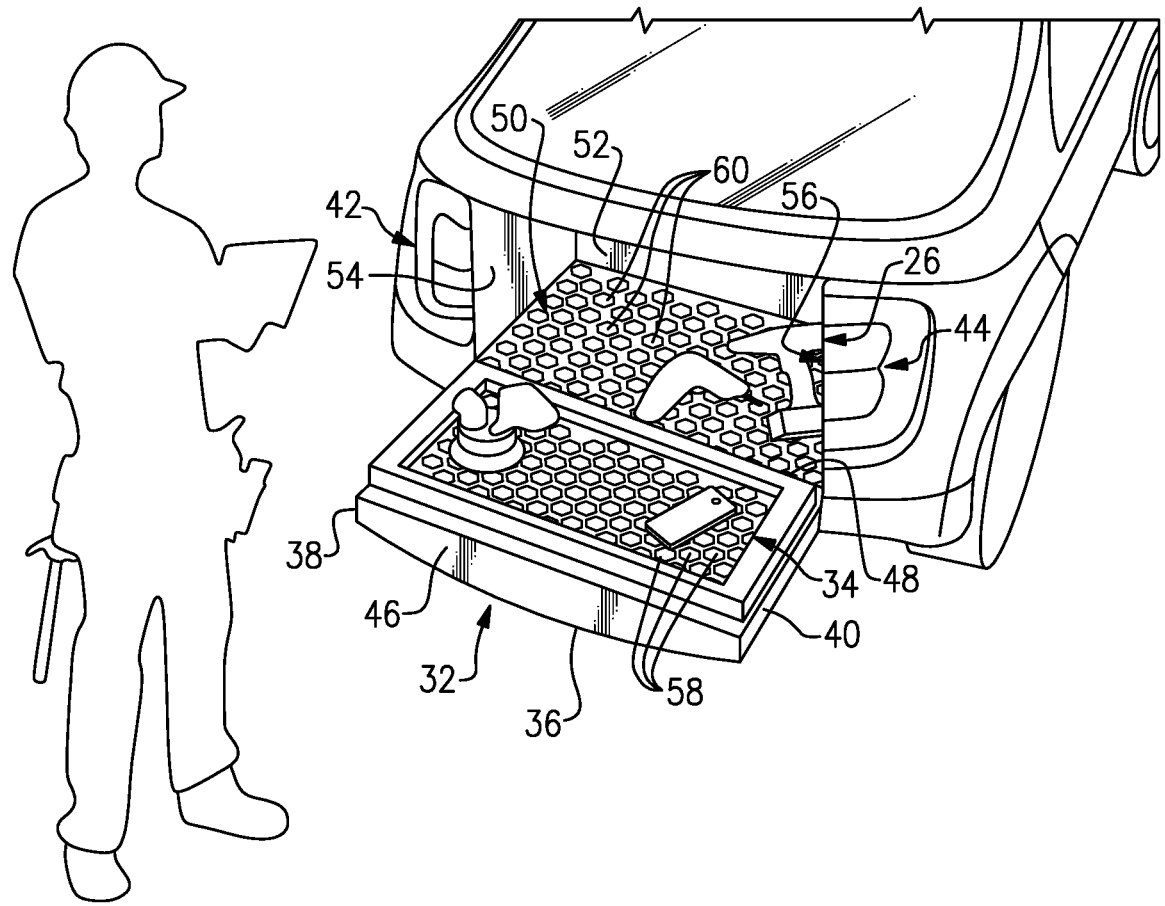
FIG. 2 illustrates a first embodiment of a front trunk of this disclosure.

FIG. 2 illustrates the grille panel 32 in its open position. When moving to the open position, the grille panel 32 has rotated forwardly and downwardly about axis $A_1$ relative to the closed position of FIG. 1. With the grille panel 32 in the open position, the front trunk 26 is accessible from the front.

The grille panel 32 is rotatable about the axis $A_1$ via a pair of hinges to selectively cover and uncover the front trunk 26. The hinges may be provided by strand hinges, in which one of the strands is curved. The hinges may alternatively be provided by another type of hinge, such as a barrel hinge, or a linkage, such as a four bar linkage.

The grille panel 32 includes first surface 34 and a second surface 36 opposite the first surface 34. When the grille panel 32 is closed, the first surface 34 faces the front trunk 26. The second surface 36 provides an exterior of the vehicle 10, and in particular provides a grille in this example. When the grille panel 32 is open, the first surface 34 may be referred to as a top surface, and the second surface 36 may be referred to as a bottom surface. The first and second surfaces 34, 36 extend laterally between opposed sides 38, 40, which in this example fit between opposed headlamps 42, 44. The first and second surfaces 34, 36 also extend between edges 46, 48. When the grille panel 32 is closed, the edge 46 is a top edge and the edge 48 is a bottom edge. When the grille panel 32 is open, the edge 46 may be referred to as a front edge and the edge 48 may be referred to as a rear edge.

The first surface 34 provides a work surface substantially parallel to a ground surface G (FIG. 1) when the grille panel 32 is open. As used herein, the term "work surface" refers to a substantially flat surface configured to act as a desk, a picnic table, and/or to facilitate performance of various tasks, including by supporting items thereon. The term work surface also refers to surfaces that can be used for storage of tools or objects being worked on by tools, provide a tabletop for writing, supporting computing devices, and/or facilitating food preparation or food service, etc.

FIG. 2 illustrates the interior of the front trunk 26. The front trunk 26 includes a floor 50, a rear wall 52, and opposed lateral side walls 54, 56, which provide boundaries of a front cargo space of the vehicle 10. Various items can rest on the floor 50, and various other items can be attached and/or stored relative to the rear wall 52 and side walls 54, 56, in this example.

In an aspect of this disclosure, the front trunk 26 includes at least one wireless charger configured to facilitate wireless charging of one or more electronic devices in or near the front trunk 26. In this disclosure, the closure assembly 28, and in particular the grille panel 32, is considered part of the front trunk 26, even when the closure assembly 28 is open.

In one example, both the first surface 34 and the floor 50 include wireless chargers configured to direct power from the battery pack 18 to various electronic devices placed on or near the first surface 34 and the floor 50. While both the first surface 34 and the floor 50 include wireless chargers in this example, this disclosure extends to embodiments in which only one of the first surface 34 and the floor 50 includes wireless chargers. Further, this disclosure extends to embodiments in which other surfaces of the front trunk 26 include wireless chargers.

In a particular aspect of this disclosure, a top of the first surface 34 and a top of the floor 50 lie in a common plane, which is substantially parallel to the ground surface G. In this way, when both the first surface 34 and floor 50 include wireless chargers, the first surface 34 and the floor 50 provide a relatively large, flat area for wirelessly charging multiple electronic devices.

In this embodiment, the first surface 34 includes a plurality of sender coils 58 arranged in a honeycomb pattern. The sender coils 58 can be integrally formed with the first surface 34 and coated with a coating, or can be provided by a mat that is attached to the first surface 34. The sender coils 58 exhibit a total surface area greater than half of the surface area of the first surface 34. In an example, the sender coils 58 exhibit a surface area of at least 75% of the surface area of the first surface 34.

Each of the sender coils 58 is configured to receive electric current from the battery pack 18 and, using electromagnetic induction, to create a magnetic field that can provide electricity to various portable electronic devices that are on or adjacent the sender coils 58. The portable electronic devices include receiver coils that are configured to convert the generated magnetic field into current that is used to charge the portable electronic devices. Example portable electronic devices are shown in FIG. 2. Each sender coil 58 is able to wirelessly charge an electronic device within a predetermined proximity of the sender coil 58. By including multiple sender coils, the first surface 34 is able to wirelessly charge multiple electronic devices.

The floor 50 also includes a plurality of sender coils 60 configured substantially the same way as the sender coils 58. Specifically, the sender coils 60 are configured to generate a magnetic field that can be used to charge various portable electronic devices on or near the floor 50. The sender coils 60 exhibit a total surface area greater than half of the surface area of the floor 50. In an example, the sender coils 60 exhibit a surface area of at least 75% of the surface area of floor 50. The sender coils 60 can be integrally formed with the floor 50 or provided by a mat placed on the floor 50.

The wireless chargers provided by the sender coils 58, 60 may conform to an industry standard, such as Qi or PMA wireless charging standards. As used herein, the term "wireless charger" refers to a structure or assembly that at least includes one sender coil, and is otherwise configured to facilitate wireless charging of an electronic device, which may include a receiver coil. In this regard, each of the sender coils 58, 60 themselves may be considered wireless chargers.

The vehicle 10 includes a controller C (FIG. 1) that can be part of an overall vehicle control module, such as a vehicle system controller (VSC), or could alternatively be a stand-alone controller separate from the VSC. The controller C may be programmed with executable instructions for interfacing with and operating the various components of the vehicle 10. The controller additionally includes a processing unit and non-transitory memory for executing the various control strategies and modes of the vehicle 10. The controller C can issue commands to the battery pack 18 and/or the sender coils 58, 60 to initiate wireless charging of various electronic devices in or adjacent the front trunk 26.

Figure 3:
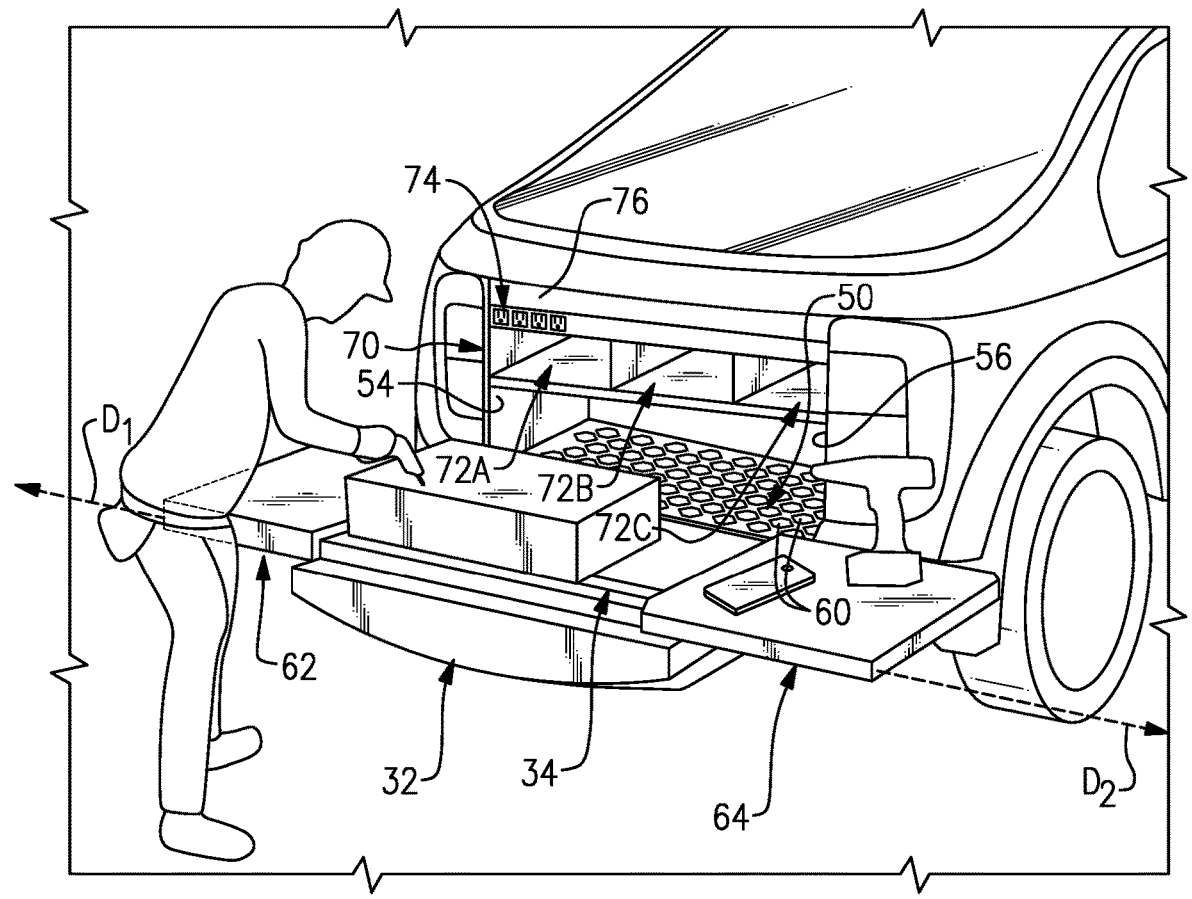
FIG. 3 illustrates a second embodiment of the front trunk.

In an aspect of this disclosure, at least one sliding panel is mounted to the grille panel 32 and configured to slide laterally to increase an effective useable surface area of the grille panel 32. In FIG. 3, in which the grille panel 32 is in the open position, the grille panel 32 includes a first panel 62 configured to slide laterally relative to the grille panel 32 in a first direction $D_1$ between an expanded and retracted position, and further includes a second panel 64 configured to slide laterally relative to the grille panel 32 in a second direction $D_2$ opposite the first direction $D_1$ between an expanded and retracted position. FIG. 3 shows both panels 62, 64 in their respective expanded positions. In the expanded positions, panels 62, 64 can support various items thereon. In their retracted positions, the panels 62, 64 fit laterally between the sides 38, 40 such that the panels 62, 64 do not impede movement of the grille panel 32 to the closed position. The directions $D_1$, $D_2$ are perpendicular to the centerline of the vehicle 10.

In an example, when the panels 62, 64 are in their respective expanded positions, the sender coils 58 of the first surface 34 are exposed and able to wirelessly charge electronic devices on or adjacent the first surface 34. The panels 62, 64 may also include sender coils configured to facilitate wireless charging. Various tools, such as vises, saws, grinders, etc., can be mounted to the panels 62, 64. The panels 62, 64 may also be replaced if they become worn, for example.

The panels 62, 64 are configured to slide relative to the grille panel 32 using one or more guides or tracks mounted between the grille panel 32 and the panels 62, 64.

The first surface 34 and/or the panels 62, 64 can be formed as textured or finished surfaces configured to resist sliding of items placed thereon. A rubber mat could be attached to or placed on the top of the first surface 34 and/or the panels 62, 64. The first surface 34 and/or the panels 62, 64 could also include one or more embossings that establish one or more measurement rulers for measuring items when positioned atop the work surface.

In an example, the grille panel 32 and panels 62, 64 are moveable by a powered assembly P (FIG. 1) in this example. The powered assembly P can include one or more powered actuators, gears, and/or linkages configured to move the grille panel 32 between the open and closed positions, and/or to slide the panels 62, 64 between the retracted and expanded positions automatically and without requiring a user to apply force. This disclosure is not limited to automatically moveable closure assemblies and panels, however. One or both of the closure assembly 28 and the panels 62, 64 could be manually moveable as an alternative to, or in addition to, being automatically moveable.

In an example, when the closure assembly 28 is closed (FIG. 1) and the panels 62, 64 are in their respective the retracted positions, in response to a command from the user, for example, the controller C is configured to command the powered assembly P to move the closure assembly 28 to the open position while simultaneously issuing a command causing the panels 62, 64 to slide to their respective expanded positions. In this way, as the closure assembly 28 opens, the panels 62, 64 gradually slide to their expanded positions. The controller C is also configured to issue commands causing the closure assembly 28 to move the closed position simultaneous with movement of the panels 62, 64 to their respective retracted positions. While simultaneous movements are described, the controller C could initiate other movements, such as stepped or staggered movements, in which the closure assembly 28 and panels 62, 64 move during different time periods.

In another aspect of this disclosure, front trunk 26 includes a plurality of storage compartments 70 mounted adjacent the top of the front trunk 26, as shown in FIG. 3. In this example, there are three storage compartments 72A-72C configured as forward-facing cubby bins that are spaced-apart laterally from one another in a direction perpendicular to a centerline of the vehicle 10. The storage compartments 72A-72C are spaced-apart vertically above the floor 50 such that items can be placed on the floor 50, and charged via the sender coils 60. The storage compartments 72A-72C are configured to permit a user to readily store and access items in the storage compartments 72A-72C. One or more surfaces of the storage compartments 72A-72C may include sender coils such that those surfaces provide a wireless charger.

The vehicle 10 may include one or more standard power outlets in or adjacent the front trunk 26 in addition to the aforementioned wireless chargers. As shown in FIG. 3, the front trunk 26 includes four 120 Volt power outlets 74 mounted above the storage compartments 72A-72C. While a particular number and type of power outlets are shown, the front trunk 26 could include another number or type of power outlets, such as 240 Volt power outlets, USB-C outlets, etc., in various locations.

In another aspect of this disclosure, a light source is configured to illuminate the grille panel 32 and panels 62, 64 (if present) to facilitate use of the same in low light conditions. With reference to FIG. 3, the vehicle 10 includes a light bar 76 extending laterally between side walls 54, 56. The light bar 76 may include one or more light emitting diodes (LEDs) or strips of LEDs configured to be selectively activated to illuminate the grille panel 32 and panels 62, 64 (if present). While a light bar 76 is shown, this disclosure extends to other light sources configured to illuminate the area below the light source, namely the grille panel 32 and/or panels 62, 64.

The light bar 76, in this example, extends an entire distance between side walls 54, 56 and provides at least a portion of a forward-facing conspicuity lamp of the vehicle 10. In particular, the light bar 76 provides at least a portion of a headlamp or headlamp assembly of the vehicle 10. The light bar 76, or another light source, is configured to become activated to emit light toward the area below the light bar 76 to illuminate the grille panel 32 and/or panels 62, 64 in response to commands from the controller C. In an aspect, the controller C is configured to tilt the light bar 76 downward when the light bar 76 is being used to illuminate the grille panel 32 as opposed to being used as a conspicuity lamp, for example.

It should be understood that terms such as "about," "substantially," and "generally" are not intended to be boundaryless terms, and should be interpreted consistent with the way one skilled in the art would interpret those terms. Further, directional terms such as "forward," "rearward," "upward," "downward," "vertical," "horizontal," etc., are used with reference to the normal operational orientation of the vehicle and are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
 a front trunk including a floor, wherein the floor includes a wireless charger, and wherein the wireless charger of the floor is provided by a plurality of sender coils exhibiting a total surface area greater than half a total surface area of the floor; and
 a closure assembly configured to move between closed and open positions to selectively cover and uncover the front trunk, wherein a surface of the closure assembly includes a wireless charger, and wherein the wireless charger of the closure assembly is provided by a plurality of sender coils exhibiting a total surface area greater than half a total surface area of the surface of the closure assembly.

2. The motor vehicle as recited in claim 1, further comprising a plurality of storage compartments arranged within the front trunk and spaced-apart above the floor, wherein each of the storage compartments includes a wireless charger.

3. The motor vehicle as recited in claim 2, further comprising a plurality of electrical outlets arranged above the plurality of storage compartments.

4. The motor vehicle as recited in claim 2, further comprising a light source arranged above the plurality of storage compartments and configured to illuminate an area below the light source.

5. The motor vehicle as recited in claim 1, wherein the closure assembly includes a grille panel configured to rotate between a closed position and an open position to selectively cover and uncover the front trunk from a front, and the surface is a surface of the grille panel facing an interior of the front trunk when the grille panel is closed.

6. The motor vehicle as recited in claim 5, wherein, when the grille panel is open, the surface is substantially parallel to a ground surface and lies in a common plane with the floor.

7. The motor vehicle as recited in claim 6, further comprising at least one panel configured to slide laterally relative to the grille panel between an expanded and retracted position when the grille panel is open.

8. The motor vehicle as recited in claim 7, further comprising a tool mounted to the at least one panel.

9. The motor vehicle as recited in claim 7, wherein the at least one panel is replaceable.

10. A motor vehicle, comprising:
 a front trunk;
 a closure assembly configured to move between closed and open positions to selectively cover and uncover the front trunk;
 wherein the closure assembly includes a grille panel configured to rotate between a closed position and an open position to selectively cover and uncover the front trunk from a front,
 wherein the grille panel includes a first surface facing the front trunk when the grille panel is closed,
 wherein the closure assembly further includes a first panel configured to slide laterally relative to the grille panel in a first direction between an expanded and retracted position and a second panel configured to slide laterally relative to the grille panel in a second direction opposite the first direction between an expanded and retracted position, wherein a surface of the grille panel includes a first wireless charger, a surface of the first panel includes a second wireless charger, and a surface of the second panel includes a third wireless charger, and wherein the first wireless charger is provided by a plurality of sender coils exhibiting a total surface area greater than half a total surface area of the first surface of the grille panel.

11. The motor vehicle as recited in claim 10, further comprising a light source arranged adjacent a top of the front trunk, wherein, when the grille panel is open and the first and second panels are in respective expanded positions, the light source is configured to illuminate the grille panel, the first panel, and the second panel.

12. The motor vehicle as recited in claim 1, wherein the motor vehicle is an electrified vehicle including a battery pack, and wherein the motor vehicle is configured to provide electricity from the battery pack to the wireless charger.

13. A method, comprising:
wirelessly charging a portable electronic device adjacent a front trunk of a motor vehicle;
rotating a grille panel to an open position in which a top surface of the grille panel is substantially parallel to a ground surface, wherein the top surface includes a wireless charger, ; and
tilting a light source to illuminate the top surface, wherein the light source is configured to provide at least a portion of a headlamp or headlamp assembly of the motor vehicle.

14. The method as recited in claim 13, further comprising, when the grille panel is open, sliding at least one panel laterally relative to the grille panel between an expanded and retracted position.

15. The method as recited in claim 14, further comprising, when the grille panel is open and the at least one panel is in an expanded position, illuminating the grille panel and the at least one panel by activating the light source.

16. The motor vehicle as recited in claim 7, wherein the at least one panel also includes a wireless charger.

17. The motor vehicle as recited in claim 1, wherein;
the wireless charger of the floor is provided by a plurality of sender coils exhibiting a total surface area of at least 75% of a total surface area of the floor, and
the wireless charger of the closure assembly is provided by a plurality of sender coils exhibiting a total surface area of at least 75% of a total surface area of the surface of the closure assembly.

18. The motor vehicle as recited in claim 1, wherein:
the plurality of sender coils providing the wireless charger of the floor are provided by a mat arranged on the floor, and
the plurality of sender coils providing the wireless charger of the closure assembly are provided by a mat that is attached to the surface of the closure assembly.

19. The method as recited in claim 13, further comprising simultaneously rotating the grille panel to the open position and sliding a panel laterally relative to the grille panel to an expanded position.

20. The method as recited in claim 13, wherein the light source is a light bar extending substantially perpendicular to a centerline of the motor vehicle.

* * * * *